United States Patent
Pitts et al.

(10) Patent No.: US 11,868,765 B2
(45) Date of Patent: Jan. 9, 2024

(54) AUTOMATICALLY PRESENTING A VISUALIZATION OF INFORMATION WITHIN A TERMINAL

(71) Applicant: Axosoft, LLC, Scottsdale, AZ (US)

(72) Inventors: James Pitts, Lakeway, TX (US); Justin Roberts, Phoenix, AZ (US); Michael Swindell, Aptos, CA (US); Wayne Williams, Jonestown, TX (US); Hamid Shojaee, Scottsdale, AZ (US)

(73) Assignee: Axosoft, LLC, Scottsdale, AZ (US)

( * ) Notice: Subject to any disclaimer, the term of this patent is extended or adjusted under 35 U.S.C. 154(b) by 62 days.

(21) Appl. No.: 17/523,916

(22) Filed: Nov. 11, 2021

(65) Prior Publication Data

US 2023/0010932 A1    Jan. 12, 2023

Related U.S. Application Data

(60) Provisional application No. 63/220,975, filed on Jul. 12, 2021.

(51) Int. Cl.

| | |
|---|---|
| *G06F 8/71* | (2018.01) |
| *G06F 11/36* | (2006.01) |
| *G06F 8/60* | (2018.01) |
| *G06F 8/41* | (2018.01) |
| *G06F 3/14* | (2006.01) |

(Continued)

(52) U.S. Cl.
CPC .............. *G06F 8/71* (2013.01); *G06F 3/14* (2013.01); *G06F 9/45512* (2013.01); *G06F 16/1873* (2019.01); *G06F 8/33* (2013.01); *G06F 8/34* (2013.01); *G06F 16/219* (2019.01)

(58) Field of Classification Search
CPC ..... G06F 8/71; G06F 8/33; G06F 8/34; G06F 16/1873; G06F 16/219; G06F 3/14; G06F 9/45512
See application file for complete search history.

(56) References Cited

U.S. PATENT DOCUMENTS 9,430,229 B1 * 8/2016 Van Zijst .............. G06F 9/3844
2020/0379736 A1 * 12/2020 Kuris ........................ G06F 8/71
(Continued)

OTHER PUBLICATIONS

Ravishankar Somasundaram, Git: Version Control for Everyone, 2013, [Retrieved on Mar. 8, 2023]. Retrieved from the internet: <URL: http://kim.marcelandkim.com/git/Git_-_Version_Control_for_Everyone.pdf> 180 Pages (1-180) (Year: 2013).*

(Continued)

*Primary Examiner* — Anibal Rivera

(57) ABSTRACT

In a computer-implemented method for automatically presenting a visualization of information within a terminal for interfacing with a distributed version control system, an input is received at a command line interface of a terminal for interfacing with a distributed version control system, the input including an operation to be performed by the distributed version control system. The operation to be performed by the distributed version control system is identified based on the input. The operation is executed to generate output of the operation. The output is displayed within the command line interface. A graphical visualization of the output is automatically displayed within a visualization pane of the terminal, wherein the graphical visualization is interactive.

20 Claims, 11 Drawing Sheets

(51) Int. Cl.
    *G06F 9/455*     (2018.01)
    *G06F 16/18*     (2019.01)
    *G06F 16/21*     (2019.01)
    *G06F 8/33*     (2018.01)
    *G06F 8/34*     (2018.01)

(56) References Cited

U.S. PATENT DOCUMENTS

| | | | |
|---|---|---|---|
| 2021/0342725 A1* | 11/2021 | Marsden | G06F 16/908 |
| 2022/0283786 A1* | 9/2022 | Wolfe | G06F 8/34 |

OTHER PUBLICATIONS

Scott Chacon et al., Pro Git, 2014, [Retrieved on Mar. 8, 2023]. Retrieved from the internet: <URL: https://link.springer.com/chapter/10.1007/978-1-4842-0076-6_11> 441 Pages (1-441) (Year: 2014).*

Stack Overflow, Explore git-diff output in a GUI?, 2010, [Retrieved on Mar. 8, 2023]. Retrieved from the internet: < URL: https://stackoverflow.com/questions/4160224/explore-git-diff-output-in-a-gui> 5 Pages (1-5) (Year: 2010).*

Gitkraken, Git Interactive Rebase, Feb. 2021, [Retrieved on Mar. 8, 2023]. Retrieved from the internet: <URL: https://www.gitkraken.com/learn/git/problems/git-interactive-rebase> 15 Pages (1-15) (Year: 2021).*

Matthieu Moy, Advance use of Git, 2020, [Retrieved on Mar. 8, 2023]. Retrieved from the internet: <URL: https://matthieu-moy.fr/cours/formation-git/advanced-git-slides.pdf> 135 Pages (1-135) (Year: 2020).*

Lassi Haaranen et al., Teaching Git on the Side—Version Control System as a Course Platform, 2012, [Retrieved on Aug. 14, 2023]. Retrieved from the internet: <URL: https://dl.acm.org/doi/pdf/10.1145/2729094.2742608>6 Pages (87-92) (Year: 2015).*

* cited by examiner

FIG. 3

AUTOMATICALLY PRESENTING A VISUALIZATION OF INFORMATION WITHIN A TERMINAL

RELATED APPLICATIONS

This application claims priority to and the benefit of U.S. Provisional Patent Application 63/220,975, filed on Jul. 12, 2021, entitled "AUTOMATICALLY PRESENTING A VISUALIZATION OF INFORMATION WITHIN A TERMINAL" by Pitts et al., and assigned to the assignee of the present application, which is incorporated herein by reference in its entirety

BACKGROUND

Distributed version control systems, such as Git, are used for tracking changes in a set of files for coordinating software development among multiple parties, such as during source code development. Such distributed version control systems allow for the creation and development of branches within the software development, tracking of the changes made to the files in the branches, and merging of the branches into the overall project. The changes made to the files are committed to the overall project, where a commit is a point in the development history in which a branch of development is saved into a repository for the overall project.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

FIG. 3 is a screen shot illustrating an example terminal including a command line interface and a visualization pane illustrating a graph view for interfacing with a distributed version control system, in accordance with embodiments.

DESCRIPTION OF EMBODIMENTS

Figure 1:
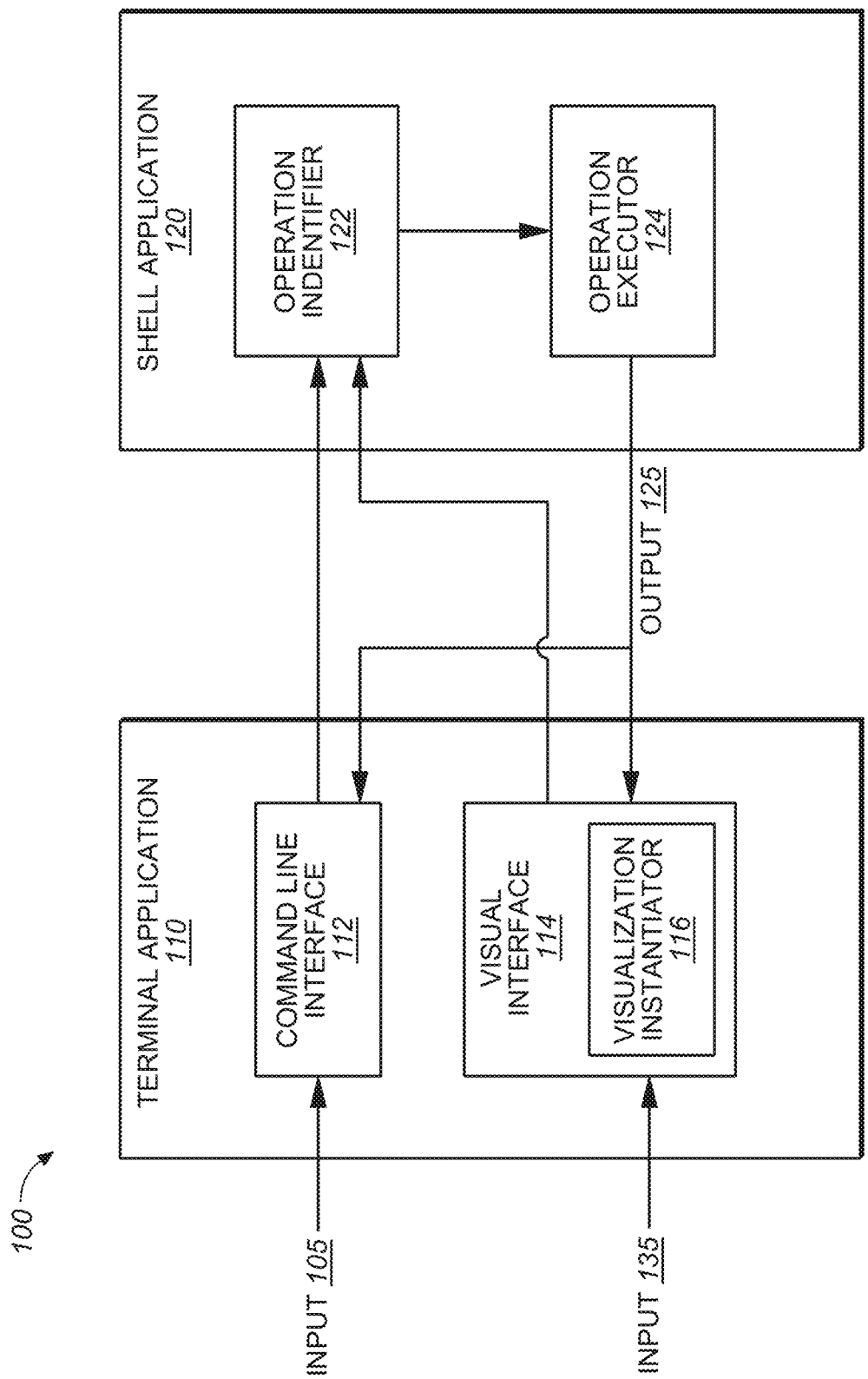
FIG. 1 is a block diagram illustrating a system for automatically presenting a visualization of information within a terminal for interfacing with a distributed version control system, in accordance with embodiments.

Reference will now be made in detail to various embodiments of the subject matter, examples of which are illustrated in the accompanying drawings. While various embodiments are discussed herein, it will be understood that they are not intended to be limited to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments. As denoted elsewhere herein, like element numbers are intended to indicate like elements or features.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "receiving," "executing," "identifying," "displaying," "generating," "updating," "interfacing," "presenting," "determining," "applying," "instantiating," or the like, refer to the actions and processes of an electronic computing device or system such as: a host processor, a processor, a memory, a cloud-computing environment, a software defined network (SDN) manager, a system manager, a computer system of a distributed computing system, or the like, or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Example embodiments described herein improve the performance of computer systems by automatically providing visualization of information within a terminal for interfacing with a distributed version control system. Embodiments described herein receive an input at a command line interface of a terminal for interfacing with a distributed version control system and automatically display a graphical visualization of the output within a visualization pane of the terminal. In some embodiments, the graphical visualization is automatically updated in response to receiving an interaction at the graphical visualization within the visualization pane of the terminal.

Distributed version control systems, such as Git, are used for tracking changes in a set of files for coordinating software development among multiple parties, such as during source code development. Such distributed version control systems allow for the creation and development of branches within the software development, tracking of the changes made to the files in the branches, and merging of the branches into the overall project. The changes made to the files are committed to the overall project, where a commit is a point in the development history in which a branch of development is saved into a repository for the overall project.

Conventionally, distributed version control system are accessed exclusively through a command line interface (CLI), e.g., text-based, or exclusively through a visual graphical user interface (GUI). The CLI requires a user to enter a command or series of commands as textual input at a command line prompt. Specifically, the CLI requires a user to utilize, either through memorization or research, a vast number of commands for interacting with the distributed version control system. Due to the significant time investment required to learn how to interact with a distributed version control system using a CLI, and the comfort associated with understanding interaction using the CLI, many users are averse to using a visual GUI.

Visual GUIs for interfacing with distributed version control systems were developed to provide visualization associated with the software development managed by the distributed version control systems. For example, visual GUIs provide visualizations of the log graph, show branches, histories, and commits for a software project under development. Visual GUIs provide enhanced efficiencies in many aspects of distributed version control systems, e.g., by presenting an interactive visualization of the overall software project development.

Users of the CLI for interfacing with distributed version control systems typically are reluctant to using visual GUIs. For example, legacy users that are comfortable using the CLI are disinclined to use a visual GUI, despite the enhanced efficiencies of visual GUIs with distributed version control systems.

Embodiments described herein provide a terminal including a CLI and a visualization pane for providing both CLI and visual GUI interfacing with distributed version control systems. The described embodiments are configured to receive input at the CLI within the terminal and based on the input, automatically generate a visualization within a visualization pane of the terminal. The visualization is interactive, allowing a user to interact directly with the visualization that is automatically generated. In some embodiments, inputs at the CLI are operable to update the visualization within the terminal.

Embodiments described herein provide methods and systems for automatically presenting a visualization of information within a terminal for interfacing with a distributed version control system. In some embodiments, the distributed version control system is Git. An input is received at a command line interface of a terminal for interfacing with a distributed version control system, the input including an operation to be performed by the distributed version control system. The operation to be performed by the distributed version control system is identified based on the input. The operation is executed to generate output of the operation. The output is displayed within the command line interface. A graphical visualization of the output is automatically displayed within a visualization pane of the terminal, wherein the graphical visualization is interactive.

In some embodiments, a second input is received at the command line interface of the terminal, the second input including a second operation to be performed by the distributed version control system. The graphical visualization is automatically updated within the visualization pane of the terminal to reflect a second output of the second operation. In some embodiments, the second operation includes a commit command, such that the graphical visualization is automatically updated to reflect the second output of the commit command. In some embodiments, a selection is received at the graphical visualization of the output within the visualization pane. The graphical visualization is automatically updated responsive to the selection.

In one embodiment, the operation includes a change directory command. In some embodiments, the graphical visualization of the output includes a log graph of a directory identified by the input. In some embodiments, a selection of a node of the graphical visualization of the log graph is received within the visualization pane. The graphical visualization is automatically updated responsive to the selection of the node. In one embodiment, the operation includes a difference command for determining differences between file versions. In some embodiments, the graphical visualization of the output includes the differences between the file versions identified by the input. In one embodiment, operation includes a history command for determining a history of commits made within the distributed version control system. In some embodiments, the graphical visualization of the output includes a historical view of commits made within the distributed version control system. In one embodiment, the operation includes a blame command for determining a line by line modification attributions made within the distributed version control system. In some embodiments, the graphical visualization of the output includes a blame view of the line by line modification attributions made within the distributed version control system. In one embodiment, the operation includes a rebase command for applying a sequence of commits from different branches into a final commit within the distributed version control system. In some embodiments, the graphical visualization of the output includes a visual interactive rebase within the distributed version control system.

Hence, the embodiments of the present invention greatly extend beyond conventional methods of visualizing output at a terminal for interfacing with a shell application. For instance, automatically presenting a visualization of information within a terminal for interfacing with a distributed version control system improves the performance of software design by automatically providing developers with graphical visualizations of targeted information by analyzing the input at a command line interface, without requiring additional input from the developers. Accordingly, embodiments of the present invention amount to significantly more than merely using a computer to visualize output at a terminal for interfacing with a shell application. Instead, embodiments of the present invention specifically recite a novel process, rooted in computer technology, for automatically presenting a visualization of information within a terminal for interfacing with a distributed version control system, improving performance of software development and improving performance of the underlying computer system.

Example System for Automatically Presenting a Visualization of Information within a Terminal for Interfacing with a Distributed Version Control System FIG. 1 is a block diagram illustrating a system 100 for automatically presenting a visualization of information within a terminal for interfacing with a distributed version control system, in accordance with embodiments. System 100 includes terminal application 110 for interfacing with shell application 120, where in accordance with various embodiments, shell application 120 is a distributed version control system such as Git.

Distributed version control systems, such as Git, are used for tracking changes in a set of files for coordinating software development among multiple parties, such as during source code development. Distributed version control systems allow for the creation and development of branches within the software development by different users, tracking of the changes made to the files in the branches by the different users, and merging of the branches into the overall project. In order to interface with a shell application 120 associated with a distributed version control system, users interact with terminal application 110. It should be appreciated that any distributed version control system shell application 120 can be utilized in accordance with the described embodiments, such as Git Bash.

Terminal application 110, in accordance with the described embodiments, includes a command line interface (CLI) 112 and a visual interface 114. Command line interface 112 is configured to receive text input 105 for interfacing with shell application 120. For example, users operating system 100 submit text input 105 into command line interface 112 for executing operations by shell application 120.

Figure 2:
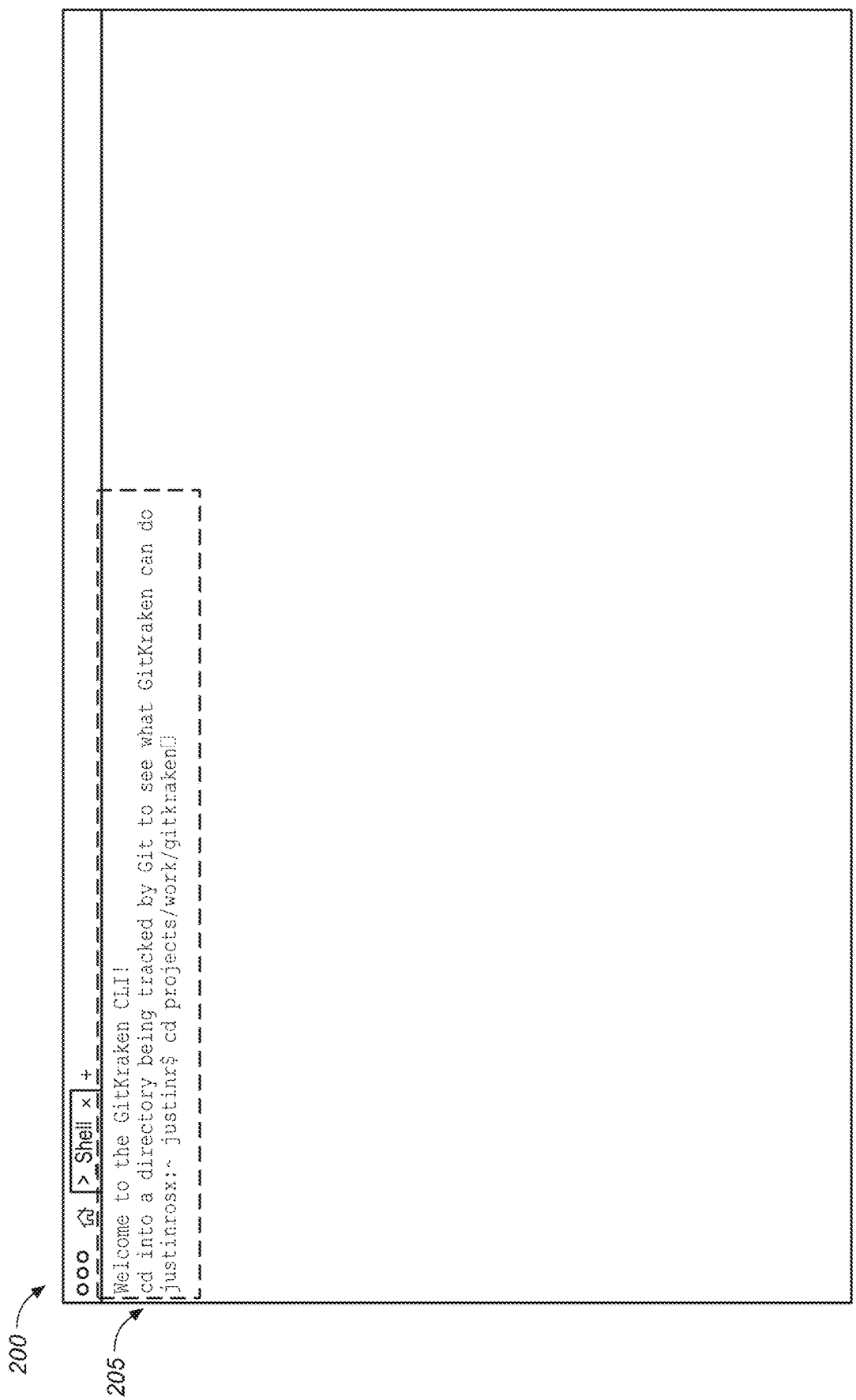
FIG. 2 is a screen shot illustrating an example terminal including a command line interface for interfacing with a distributed version control system, in accordance with embodiments.

FIG. 2 is a screen shot illustrating an example terminal 200 including a command line interface 205 for interfacing with a distributed version control system, in accordance with embodiments. As illustrated, command line interface 205 is displayed within terminal 200 and is capable of receiving text input, e.g., at a command line interface prompt. It should be appreciated that command line interface 205 is configured to receive input as text and display output as text.

Returning to FIG. 1, shell application 120 receives input 105 from terminal application 110 at operation identifier 122, where operation identifier 122 is configured to identify the operation to be performed by shell application 120 based on the input 105. Operation identifier 122 analyzes the text of input 105 to determine whether an how to present a visual representation of an associated output 125 to improve the user experience of interaction with terminal 110. For instance, a user may be unaware of availability of a visual representation of a desired output, or may prefer using command line interface 112 for entering input 105 despite command line interface 112 despite the inherent limitations of presenting output 125 as text.

The operation is then executed at operation executor 124 based on input 105 to generate output 125. It should be appreciated that shell application 120 is configured to perform any type of operation of a distributed version control system, such as and without limitation: a change directory command for changing a directory, a difference command for determining differences between file versions, a history command for determining a history of commits made within the distributed version control system, a blame command for determining a line by line modification attributions made within the distributed version control system, and a rebase command for applying a sequence of commits from different branches into a final commit within the distributed version control system.

Shell application 120 generates output 125 at operation executor 124 and transmits output 125 to command line interface 112 and visual interface 114. Command line interface 112 displays a text representation (e.g., characters) of output 125. Visual interface 114 automatically displays a graphical visualization of output 125 within terminal 110. For example, visual interface 114 renders a visualization pane within terminal 110 for displaying output 125. It should be appreciated that the graphical visualization of output 125 within terminal 110 is automatically displayed without additional input from the user, and is generated based on input 105 received at command line interface 112.

Figure 3:
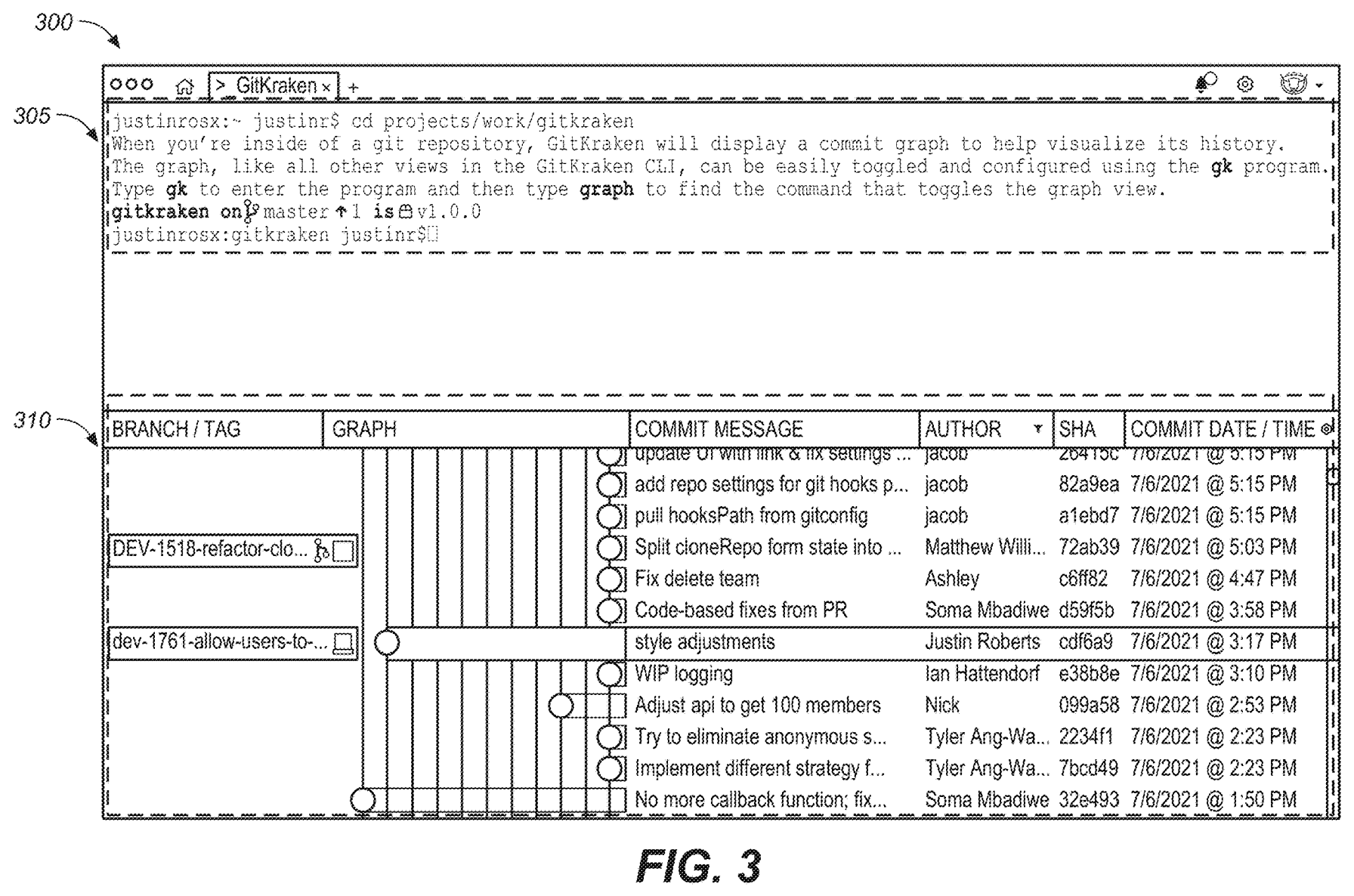

FIG. 3 is a screen shot illustrating an example terminal 300 including a command line interface 305 and a visualization pane 310 illustrating a graph view for interfacing with a distributed version control system, in accordance with embodiments. As illustrated, command line interface 305 is displayed within terminal 300 and is capable of receiving text input. In the illustrated embodiment, the text input includes a graph view command. Responsive to the input including the graph view command received at command line interface 305, a graphical representation of the associated graph view output is automatically displayed within visualization pane 310. It should be appreciated that the graphical representation of the graph view within visualization pane 310 is interactive, such that user selections made within the graphical representation operate as inputs for updating the graphical representation.

With reference to FIG. 1, in some embodiments, visual interface 114 includes visualization instantiator 116. Visualization instantiator 116 is configured to determine whether visual interface 114 (e.g., a visualization pane) is displayed within terminal 110. In response to determining that visual interface 114 is not displayed within terminal 110, instantiates a display of visual interface 114 within terminal 110 for displaying output 125. For example, a user interacting with terminal 110 enters input 105 at command line interface 112, which causes the generation of output 125. At the first instance of an output 125 causing a graphical visualization of output 125, visualization instantiator 116 instantiates a display of visual interface 114 within terminal 110 for displaying output 125. In other words, visual interface 114 is not displayed within terminal 110 until an output 125 causes the instantiation of visual interface 114.

Once visual interface 114 is instantiated and displays a graphical representation of output 125, in accordance with some embodiments, a user is able to interact with the graphical representation of output 125 at visual interface 114. In response to receiving a selection at the graphical representation of output 125 at visual interface 114, e.g., as input 135, the graphical representation of output 125 is automatically updated at visual interface 114 according to the selection. For example, where the graphical visualization of output 125 includes a log graph of a directory identified by input 105, a selection of a node of the graphical visualization of the log graph within the visualization pane as input 135 automatically updates the graphical visualization responsive to the selection of the node.

In accordance with some embodiments, once visual interface 114 is instantiated and displays a graphical representation of output 125, a user can continue to interact with command line interface 112 to update the graphical representation of output 125 within visual interface 114. For instance, a second input 105 at command line interface 112 including a second operation to be performed by shell application 120 causes the graphical visualization to automatically update within visual interface 114 (e.g., the visualization pane of terminal 110) to reflect a second output 125 of the second operation. For example, where the second operation of second input 105 includes a commit command, the graphical visualization within visual interface 114 is automatically updated to reflect the second output 125 of the commit command.

Figure 4:
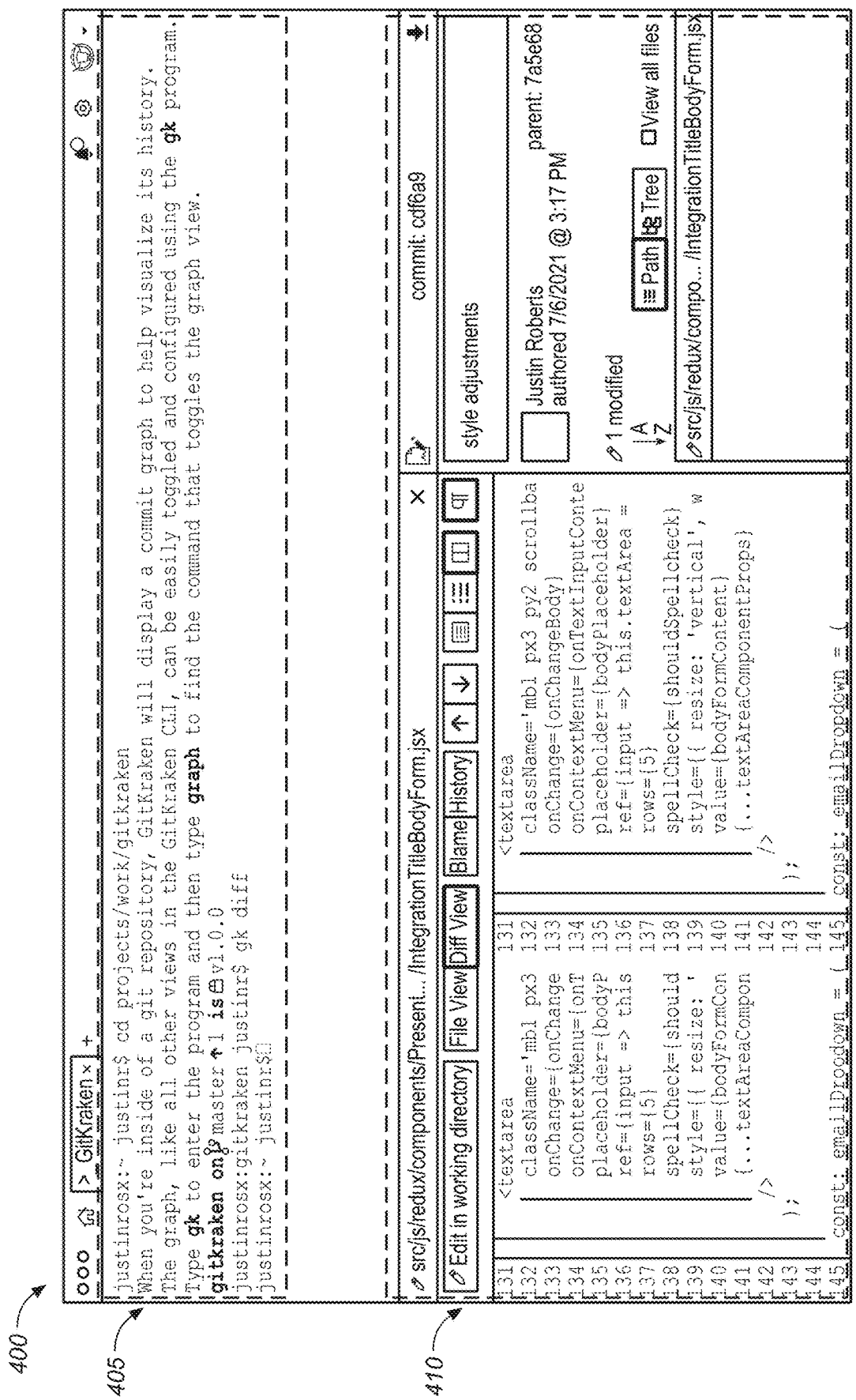
FIG. 4 is a screen shot illustrating an example terminal including a command line interface and a visualization pane illustrating a difference view for interfacing with a distributed version control system, in accordance with embodiments.

FIG. 4 is a screen shot illustrating an example terminal 400 including a command line interface 405 and a visualization pane 410 illustrating a difference view for interfacing with a distributed version control system, in accordance with embodiments. As illustrated, command line interface 405 is displayed within terminal 400 and is capable of receiving text input. In the illustrated embodiment, the text input includes a difference view command. Responsive to the input including the difference view command received at command line interface 405, a graphical representation of the associated difference view output is automatically displayed within visualization pane 410. It should be appreciated that the graphical representation of the difference view within visualization pane 410 is interactive, such that user selections made within the graphical representation of the difference view operate as inputs for updating the graphical representation.

Figure 5:
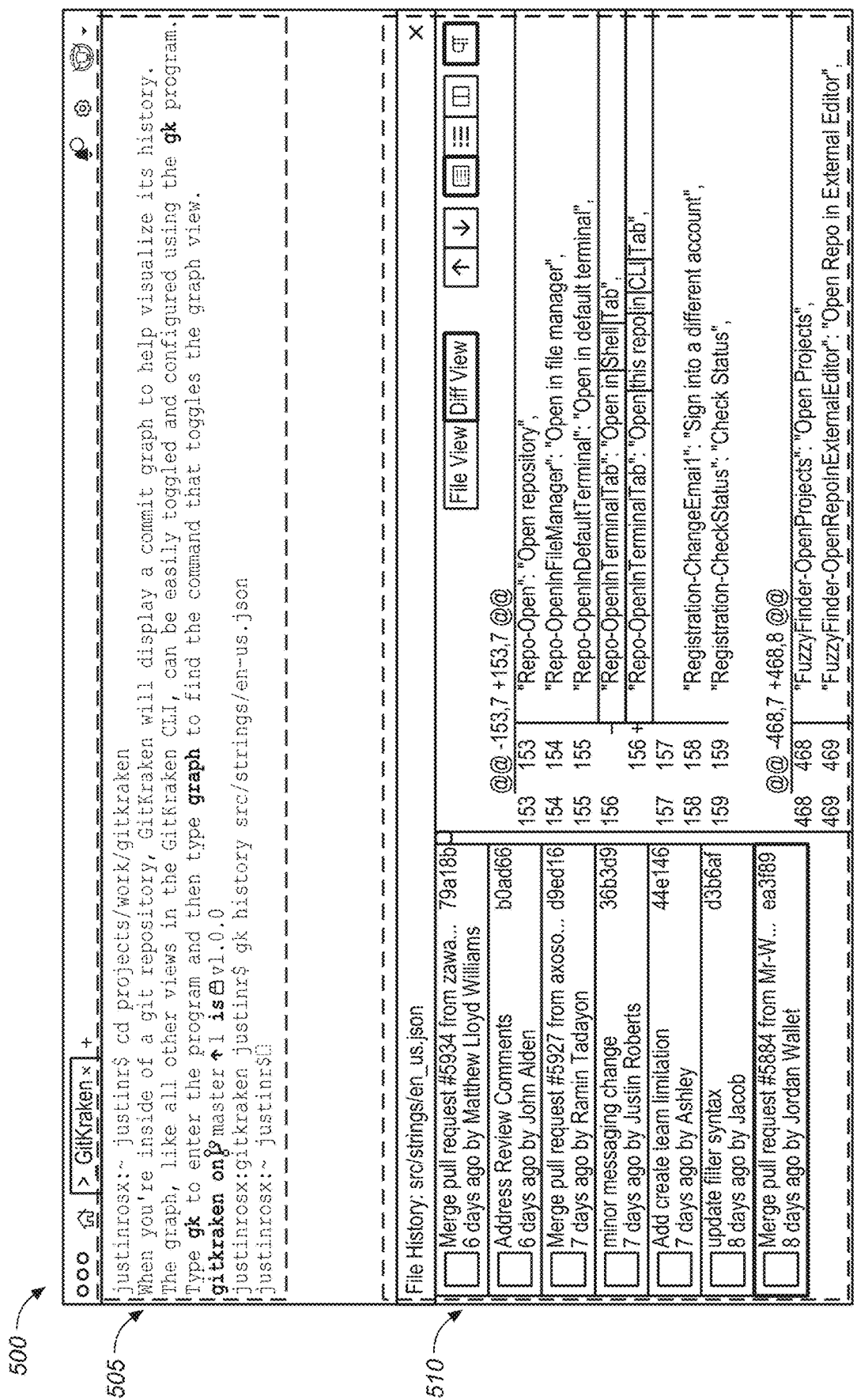
FIG. 5 is a screen shot illustrating an example terminal including a command line interface and a visualization pane illustrating a history view of commits for interfacing with a distributed version control system, in accordance with embodiments.

FIG. 5 is a screen shot illustrating an example terminal 500 including a command line interface 505 and a visualization pane 510 illustrating a history view of commits for interfacing with a distributed version control system, in accordance with embodiments. As illustrated, command line interface 505 is displayed within terminal 500 and is capable of receiving text input. In the illustrated embodiment, the text input includes a history view of commits command. Responsive to the input including the history view of commits command received at command line interface 505, a graphical representation of the associated history view of commits output is automatically displayed within visualization pane 510. It should be appreciated that the graphical representation of the history view of commits within visualization pane 510 is interactive, such that user selections made within the graphical representation of the history view of commits operate as inputs for updating the graphical representation.

Figure 6:
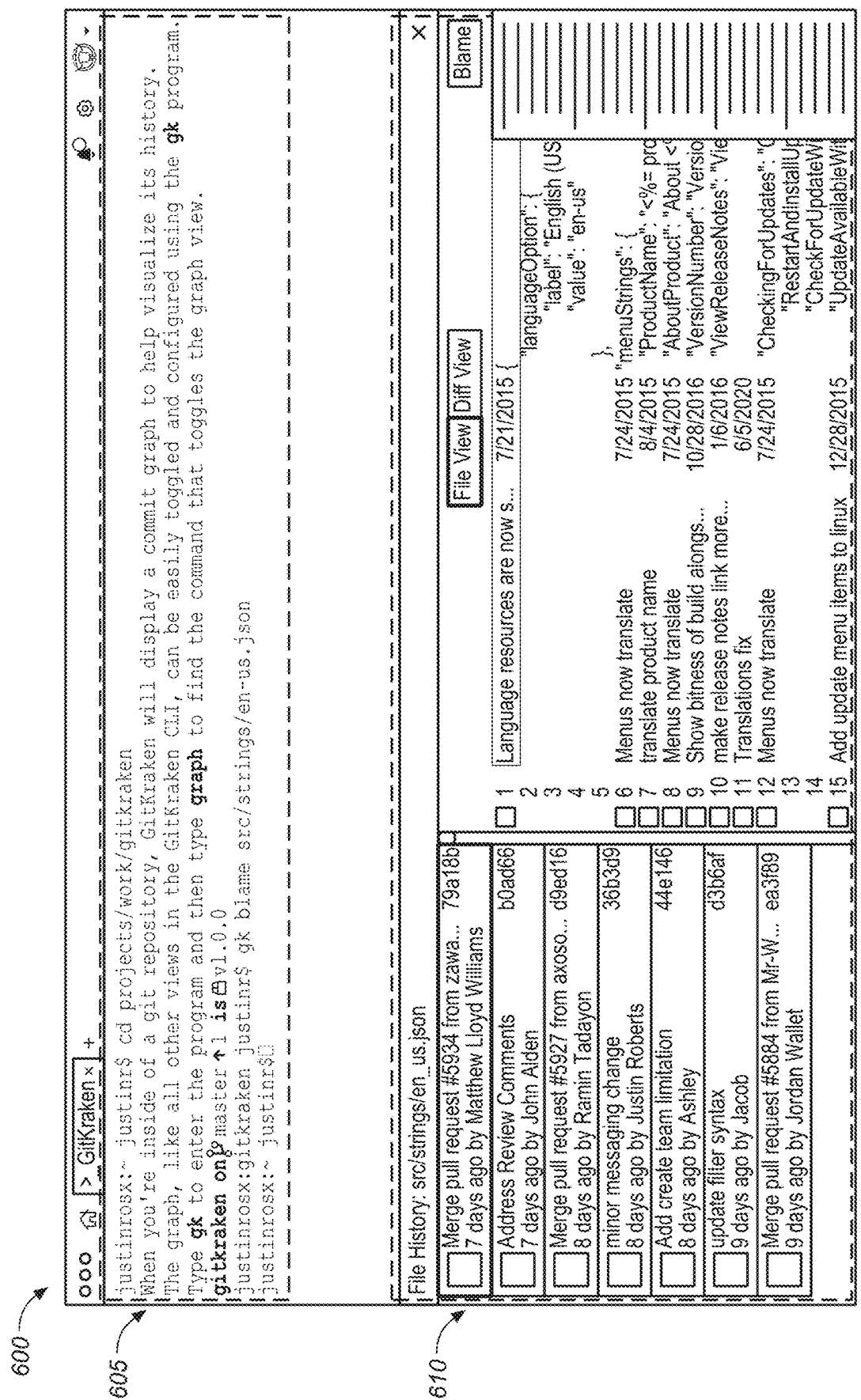
FIG. 6 is a screen shot illustrating an example terminal including a command line interface and a visualization pane illustrating a blame view of commits for interfacing with a distributed version control system, in accordance with embodiments.

FIG. 6 is a screen shot illustrating an example terminal 600 including a command line interface 605 and a visualization pane 610 illustrating a blame view of commits for interfacing with a distributed version control system, in accordance with embodiments. As illustrated, command line interface 605 is displayed within terminal 600 and is capable of receiving text input. In the illustrated embodiment, the text input includes a blame view of commits command. Responsive to the input including the blame view of commits command received at command line interface 605, a graphical representation of the associated blame view of commits output is automatically displayed within visualization pane 610. It should be appreciated that the graphical representation of the blame view of commits within visualization pane 610 is interactive, such that user selections made within the graphical representation of the history view of commits operate as inputs for updating the graphical representation.

Figure 7:
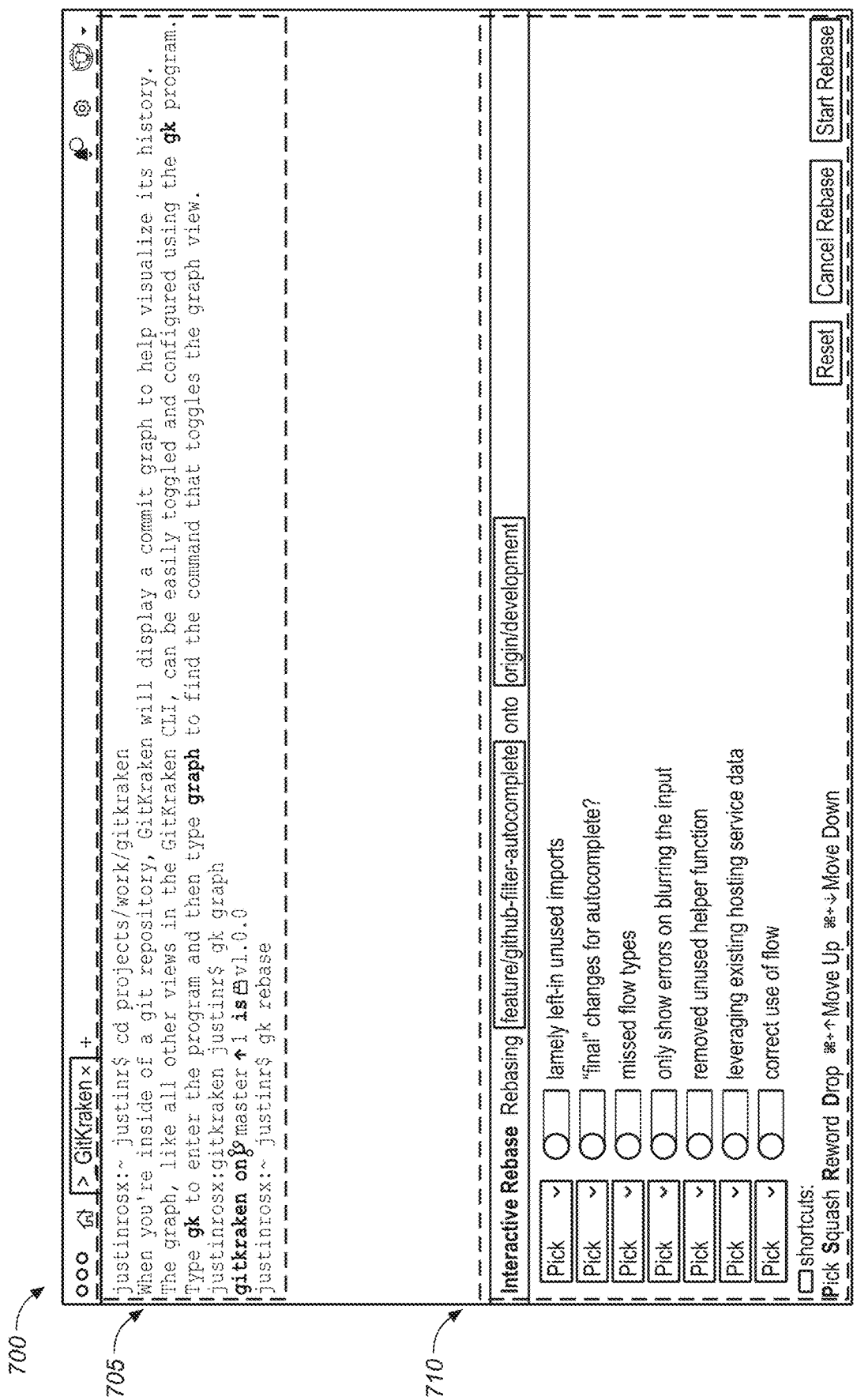
FIG. 7 is a screen shot illustrating an example terminal including a command line interface and a visualization pane illustrating a rebase view for interfacing with a distributed version control system, in accordance with embodiments.

FIG. 7 is a screen shot illustrating an example terminal 700 including a command line interface 705 and a visualization pane 710 illustrating a rebase view for interfacing with a distributed version control system, in accordance with embodiments. As illustrated, command line interface 705 is displayed within terminal 700 and is capable of receiving text input. In the illustrated embodiment, the text input includes a rebase view command. Responsive to the input including the rebase view command received at command line interface 705, a graphical representation of the associated rebase view output is automatically displayed within visualization pane 710. It should be appreciated that the graphical representation of the rebase view within visualization pane 710 is interactive, such that user selections made within the graphical representation of the history view of commits operate as inputs for updating the graphical representation.

Example Computer System

Figure 8:
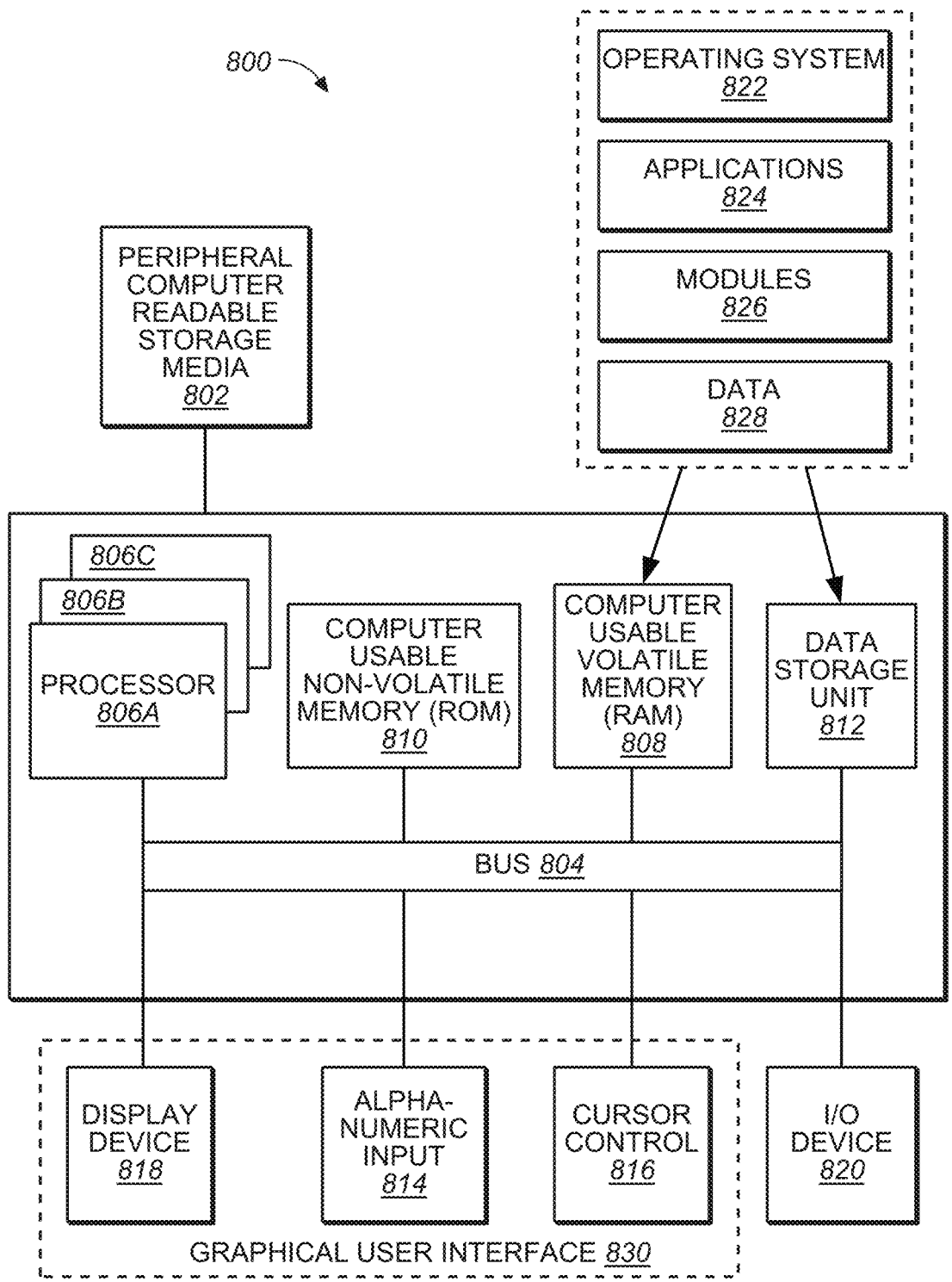
FIG. 8 is a block diagram of an example computer system upon which embodiments of the present invention can be implemented.

FIG. 8 is a block diagram of an example computer system 800 upon which embodiments of the present invention can be implemented. FIG. 8 illustrates one example of a type of computer system 800 (e.g., a computer system) that can be used in accordance with or to implement various embodiments which are discussed herein.

It is appreciated that computer system 800 of FIG. 8 is only an example and that embodiments as described herein can operate on or within a number of different computer systems including, but not limited to, general purpose networked computer systems, embedded computer systems, mobile electronic devices, smart phones, server devices, client devices, various intermediate devices/nodes, stand-alone computer systems, media centers, handheld computer systems, multi-media devices, and the like. In some embodiments, computer system 800 of FIG. 8 is well adapted to having peripheral tangible computer-readable storage media 802 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

Computer system 800 of FIG. 8 includes an address/data bus 804 for communicating information, and a processor 806A coupled with bus 804 for processing information and instructions. As depicted in FIG. 8, computer system 800 is also well suited to a multi-processor environment in which a plurality of processors 806A, 806B, and 806C are present. Conversely, computer system 800 is also well suited to having a single processor such as, for example, processor 806A. Processors 806A, 806B, and 806C may be any of various types of microprocessors. Computer system 800 also includes data storage features such as a computer usable volatile memory 808, e.g., random access memory (RAM), coupled with bus 804 for storing information and instructions for processors 806A, 806B, and 806C. Computer system 800 also includes computer usable non-volatile memory 810, e.g., read only memory (ROM), coupled with bus 804 for storing static information and instructions for processors 806A, 806B, and 806C. Also present in computer system 800 is a data storage unit 812 (e.g., a magnetic or optical disc and disc drive) coupled with bus 804 for storing information and instructions. Computer system 800 also includes an alphanumeric input device 814 including alphanumeric and function keys coupled with bus 804 for communicating information and command selections to processor 806A or processors 806A, 806B, and 806C. Computer system 800 also includes a cursor control device 816 coupled with bus 804 for communicating user input information and command selections to processor 806A or processors 806A, 8066, and 806C. In one embodiment, computer system 800 also includes a display device 818 coupled with bus 804 for displaying information.

Referring still to FIG. 8, display device 818 of FIG. 8 may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 816 allows the computer user to dynamically signal the movement of a visible symbol (cursor) on a display screen of display device 818 and indicate user selections of selectable items displayed on display device 818. Many implementations of cursor control device 816 are known in the art including a trackball, mouse, touch pad, touch screen, joystick or special keys on alphanumeric input device 814 capable of signaling movement of a given direction or manner of displacement. Alternatively, it will be appreciated that a cursor can be directed and/or activated via input from alphanumeric input device 814 using special keys and key sequence commands. Computer system 800 is also well suited to having a cursor directed by other means such as, for example, voice commands. In various embodiments, alphanumeric input device 814, cursor control device 816, and display device 818, or any combination thereof (e.g., user interface selection devices), may collectively operate to provide a graphical user interface (GUI) 830 under the direction of a processor (e.g., processor 806A or processors 806A, 806B, and 806C). GUI 830 allows user to interact with computer system 800 through graphical representations presented on display device 818 by interacting with alphanumeric input device 814 and/or cursor control device 816.

Computer system 800 also includes an I/O device 820 for coupling computer system 800 with external entities. For example, in one embodiment, I/O device 820 is a modem for enabling wired or wireless communications between computer system 800 and an external network such as, but not limited to, the Internet. In one embodiment, I/O device 820 includes a transmitter. Computer system 800 may communicate with a network by transmitting data via I/O device 820.

Referring still to FIG. 8, various other components are depicted for computer system 800. Specifically, when present, an operating system 822, applications 824, modules 826, and data 828 are shown as typically residing in one or some combination of computer usable volatile memory 808 (e.g., RAM), computer usable non-volatile memory 810 (e.g., ROM), and data storage unit 812. In some embodiments, all or portions of various embodiments described herein are stored, for example, as an application 824 and/or module 826 in memory locations within RAM 808, computer-readable storage media within data storage unit 812, peripheral computer-readable storage media 802, and/or other tangible computer-readable storage media.

Example Methods of Operation

The following discussion sets forth in detail the operation of some example methods of operation of embodiments. With reference to FIGS. 9A through 9D, flow diagrams 900, 940, 960, and 980 illustrate example procedures used by various embodiments. The flow diagrams include some procedures that, in various embodiments, are carried out by a processor under the control of computer-readable and computer-executable instructions. In this fashion, procedures described herein and in conjunction with the flow diagrams are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments (e.g., computer system 800). The computer-readable and computer-executable instructions, which reside on tangible computer readable storage media, are used to control or operate in conjunction with, for example, one or some combination of processors of the computer environments and/or virtualized environment. It is appreciated that the processor(s) may be physical or virtual or some combination (it should also be appreciated that a virtual processor is implemented on physical hardware). Although specific procedures are disclosed in the flow diagram, such procedures are examples. That is, embodiments are well suited to performing various other procedures or variations of the procedures recited in the flow diagram. Likewise, in some embodiments, the procedures in the flow diagrams may be performed in an order different than presented and/or not all of the procedures described in the flow diagrams may be performed. It is further appreciated that procedures described in the flow diagrams may be implemented in hardware, or a combination of hardware with firmware and/or software provided by computer system 800.

FIGS. 9A-9D are flow diagrams of example operations for automatically presenting a visualization of information within a terminal for interfacing with a distributed version control system, according to various embodiments.

Figure 9A:
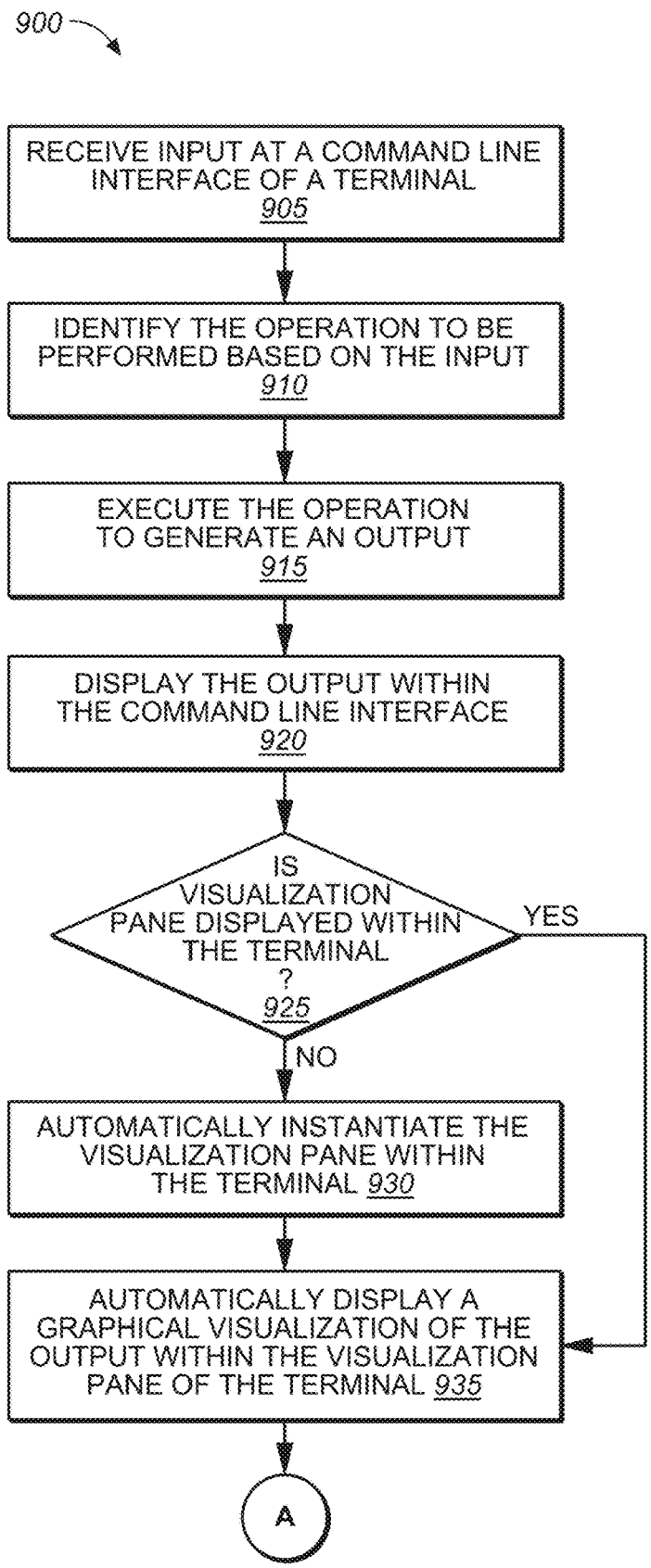
FIGS. 9A-9D are flow diagrams of example operations for automatically presenting a visualization of information within a terminal for interfacing with a distributed version control system, according to various embodiments.

FIG. 9A depicts a flow diagram 900 for automatically presenting a visualization of information within a terminal for interfacing with a distributed version control system, according to an embodiment. At procedure 905 of flow diagram 900, an input is received at a command line interface of a terminal for interfacing with a distributed version control system, the input including an operation to be performed by the distributed version control system. In some embodiments, the distributed version control system is Git.

At procedure 910, the operation to be performed by the distributed version control system is identified based on the input. At procedure 915, the operation is executed to generate output of the operation. At procedure 920, the output is displayed within the command line interface.

At procedure 925, in accordance with some embodiments, it is determined whether a visualization pane is displayed within the terminal. Provided it is determined that a visualization pane is displayed within the terminal, flow diagram 900 proceeds to procedure 935. Provided it is determined that a visualization pane is not displayed within the terminal, as shown at procedure 930, the visualization pane is automatically instantiated.

At procedure 935, a graphical visualization of the output is automatically displayed within a visualization pane of the terminal, wherein the graphical visualization is interactive.

Figure 9B:
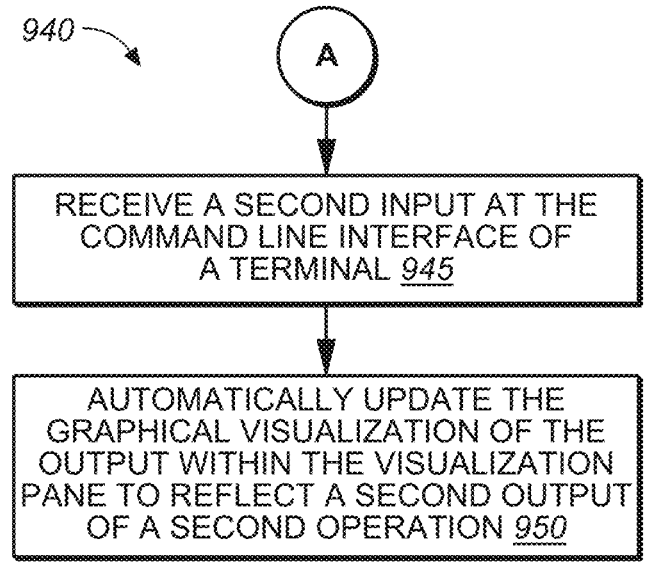

In some embodiments, as shown in FIG. 9B, flow diagram 900 of FIG. 9A proceeds into flow diagram 940 of FIG. 9B. At procedure 945 of flow diagram 940, a second input is received at the command line interface of the terminal, the second input including a second operation to be performed by the distributed version control system. At procedure 950, the graphical visualization is automatically updated within the visualization pane of the terminal to reflect a second output of the second operation. In some embodiments, the second operation includes a commit command, such that the graphical visualization is automatically updated to reflect the second output of the commit command.

Figure 9C:
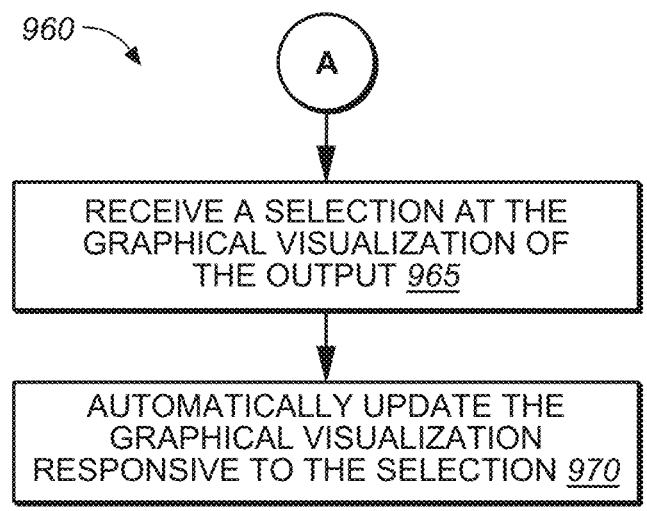

In some embodiments, as shown in FIG. 9C, flow diagram 900 of FIG. 9A proceeds into flow diagram 960 of FIG. 9C. At procedure 965 of flow diagram 960, a selection is received at the graphical visualization of the output within the visualization pane. At procedure 970, the graphical visualization is automatically updated responsive to the selection.

Figure 9D:
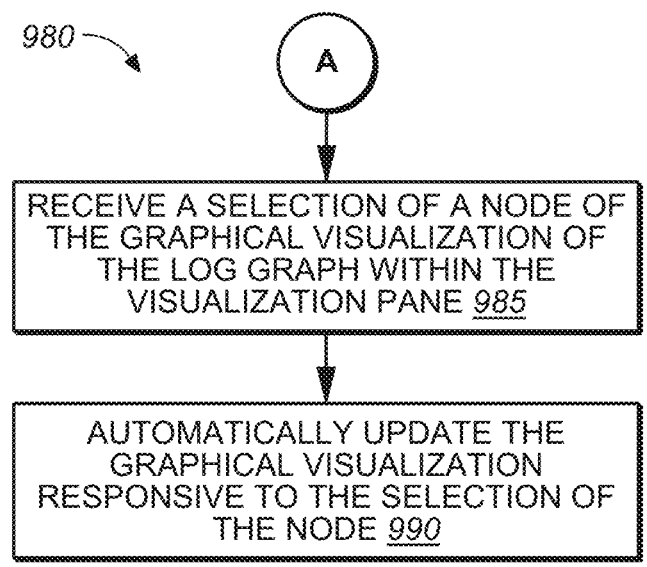

In some embodiments, as shown in FIG. 9D, flow diagram 900 of FIG. 9A proceeds into flow diagram 980 of FIG. 9D. In one embodiment, the operation includes a change directory command. In some embodiments, the graphical visualization of the output includes a log graph of a directory identified by the input. At procedure 985 of flow diagram 980, a selection of a node of the graphical visualization of the log graph is received within the visualization pane. At procedure 990, the graphical visualization is automatically updated responsive to the selection of the node.

In one embodiment, the operation includes a difference command for determining differences between file versions. In some embodiments, the graphical visualization of the output includes the differences between the file versions identified by the input. In one embodiment, operation includes a history command for determining a history of commits made within the distributed version control system. In some embodiments, the graphical visualization of the output includes a historical view of commits made within the distributed version control system. In one embodiment, the operation includes a blame command for determining a line by line modification attributions made within the distributed version control system. In some embodiments, the graphical visualization of the output includes a blame view of the line by line modification attributions made within the distributed version control system. In one embodiment, the operation includes a rebase command for applying a sequence of commits from different branches into a final commit within the distributed version control system. In some embodiments, the graphical visualization of the output includes a visual interactive rebase within the distributed version control system.

It is noted that any of the procedures, stated above, regarding the flow diagrams of FIGS. 9A through 9D may be implemented in hardware, or a combination of hardware with firmware and/or software. For example, any of the procedures are implemented by a processor(s) of a cloud environment and/or a computing environment.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible, regardless the degree of virtualization. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A computer-implemented method for automatically presenting a visualization of information within a terminal for interfacing with a distributed version control system, the method comprising:
   receiving an input at a command line interface of a terminal for interfacing with a distributed version control system, the input comprising an operation to be performed by the distributed version control system;
   identifying the operation to be performed by the distributed version control system based on the input;
   executing the operation to generate output of the operation;
   displaying the output within the command line interface; and
   automatically displaying a graphical visualization of the output within a visualization pane of the terminal, wherein the visualization pane and the command line interface are both displayed within the terminal, and wherein the graphical visualization is interactive.

2. The method of claim 1, wherein the distributed version control system is Git.

3. The method of claim 1, further comprising:
   receiving a second input at the command line interface of the terminal, the second input comprising a second operation to be performed by the distributed version control system; and
   automatically updating the graphical visualization within the visualization pane of the terminal to reflect a second output of the second operation.

4. The method of claim 3, wherein the second operation comprises a commit command, such that the graphical visualization is automatically updated to reflect the second output of the commit command.

5. The method of claim 1, further comprising:
   receiving a selection at the graphical visualization of the output within the visualization pane; and
   automatically updating the graphical visualization responsive to the selection.

6. The method of claim 1, wherein the operation comprises a change directory command.

7. The method of claim 6, wherein the graphical visualization of the output comprises a log graph of a directory identified by the input.

8. The method of claim 7, further comprising:
   receiving a selection of a node of the graphical visualization of the log graph within the visualization pane; and
   automatically updating the graphical visualization responsive to the selection of the node.

9. The method of claim 1, wherein the operation comprises a difference command for determining differences between file versions.

10. The method of claim 9, wherein the graphical visualization of the output comprises the differences between the file versions identified by the input.

11. The method of claim 1, wherein the operation comprises a history command for determining a history of commits made within the distributed version control system.

12. The method of claim 11, wherein the graphical visualization of the output comprises a historical view of commits made within the distributed version control system.

13. The method of claim 1, wherein the operation comprises a blame command for determining a line by line modification attributions made within the distributed version control system.

14. The method of claim 13, wherein the graphical visualization of the output comprises a blame view of the line by line modification attributions made within the distributed version control system.

15. The method of claim 1, wherein the operation comprises a rebase command for applying a sequence of commits from different branches into a final commit within the distributed version control system.

16. The method of claim 15, wherein the graphical visualization of the output comprises a visual interactive rebase within the distributed version control system.

17. The method of claim 1, wherein the automatically displaying the graphical visualization of the output within the visualization pane of the terminal comprises:

provided the visualization pane is not displayed within the terminal, automatically instantiating the visualization pane within the terminal.

18. A non-transitory computer readable storage medium having computer readable program code stored thereon for causing a computer system to perform a method for automatically presenting a visualization of information within a terminal for interfacing with a distributed version control system, the method comprising:
receiving an input at a command line interface of a terminal for interfacing with a distributed version control system, the input comprising a change directory operation to be performed by the distributed version control system;
identifying the change directory operation to be performed by the distributed version control system based on the input;
executing the change directory operation to change into a directory tracked by the distributed version control system;
displaying the directory within the command line interface; and
automatically displaying a graphical visualization of the directory within a visualization pane of the terminal, wherein the visualization pane and the command line interface are both displayed within the terminal, wherein the graphical visualization comprises a log graph of the directory identified by the input, and wherein the graphical visualization is interactive.

19. The non-transitory computer readable storage medium of claim 18, the method further comprising:
receiving a selection of a node of the graphical visualization of the log graph within the visualization pane; and
automatically updating the graphical visualization responsive to the selection of the node.

20. A computer system comprising:
a data storage unit; and
a processor coupled with the data storage unit, the processor configured to:
receive an input at a command line interface of a terminal for interfacing with a distributed version control system, the input comprising a change directory operation to be performed by the distributed version control system;
identify the change directory operation to be performed by the distributed version control system based on the input;
execute the change directory operation to change into a directory tracked by the distributed version control system;
display the directory within the command line interface; and
automatically display a graphical visualization of the directory within a visualization pane of the terminal, wherein the visualization pane and the command line interface are both displayed within the terminal, and wherein the graphical visualization is interactive.

* * * * *